United States Patent [19]

Golben

[11] Patent Number: 4,884,953
[45] Date of Patent: Dec. 5, 1989

[54] SOLAR POWERED PUMP WITH ELECTRICAL GENERATOR

[75] Inventor: Peter M. Golben, Florida, N.Y.

[73] Assignee: Ergenics, Inc., Wyckoff, N.J.

[21] Appl. No.: 264,689

[22] Filed: Oct. 31, 1988

[51] Int. Cl.[4] ............................................. F04B 47/00
[52] U.S. Cl. ..................................... 417/379; 60/641.8
[58] Field of Search .................. 417/379; 60/649, 673, 60/641.8

[56] References Cited

U.S. PATENT DOCUMENTS

| | | | |
|---|---|---|---|
| 4,085,590 | 4/1978 | Powell et al. | 60/649 |
| 4,262,739 | 4/1981 | Gruen et al. | 62/4 |
| 4,439,111 | 3/1984 | Seidel et al. | 417/379 |
| 4,471,617 | 9/1984 | De Beer | 60/641.8 |
| 4,631,922 | 12/1986 | Kleinwächter et al. | 60/520 |

Primary Examiner—Carlton R. Croyle
Assistant Examiner—D. Scheuermann
Attorney, Agent, or Firm—Charles E. Baxley

[57] ABSTRACT

A compressed gas engine is adapted for pumping ground water. The engine is powered by a low temperature heat source provided with a hydridable metal and hydrogen arranged operatively in a sealed loop to drive a piston. The piston is coupled magnetically to a pump piston for conjoined motion therewith. The engine is cooled by means of pumped water. A rack and pinion arrangement rides one of the pistons for electric generation.

1 Claim, 3 Drawing Sheets

SOLAR POWERED PUMP WITH ELECTRICAL GENERATOR

BACKGROUND OF THE INVENTION

This invention relates to pumping of liquids, typically water from a well in a remote arid location. A compressor engine is powered by a low temperature heat source which includes metal hydrides. A. A. Heckes and C. J. M. Northrup of Sandia National Laboratories had suggested use of a metal hydride/hydrogen reaction as a compressor heat engine. Their Sandia prototype heat engine was successful in proving a basic concept; however, their engine was susceptible to hydride poisoning and hydrogen leakage.

The present invention seeks to progress from the Sandia prototype in that:

1. Applicant's heat engine/pump is powered by hot water heated preferably by solar energy.
2. Applicant's heat engine utilizes proven metal hydrides heat transfer techniques taught, for example, in the U.S. Pat. No. 4,402,187 by Golben et al.
3. Applicant's heat engine employs a sealed magnetic piston as a work transferring medium. The sealed magnetic piston obviates need for dynamic type seals in Applicant's engine. Thus, Applicant is enabled to retain all of its stored hydrogen over the life of the engine which is designed to be twenty (20) years.
4. Due to Applicant's sealed magnetic piston approach (uses no dynamic seals) metal hydride alloy in the heat exchangers is never subjected to poisons such as oxygen and water vapor or inert gases which are known to enter similar devices through dynamic seals.

DESCRIPTION OF PREFERRED EMBODIMENT

Figure 1:
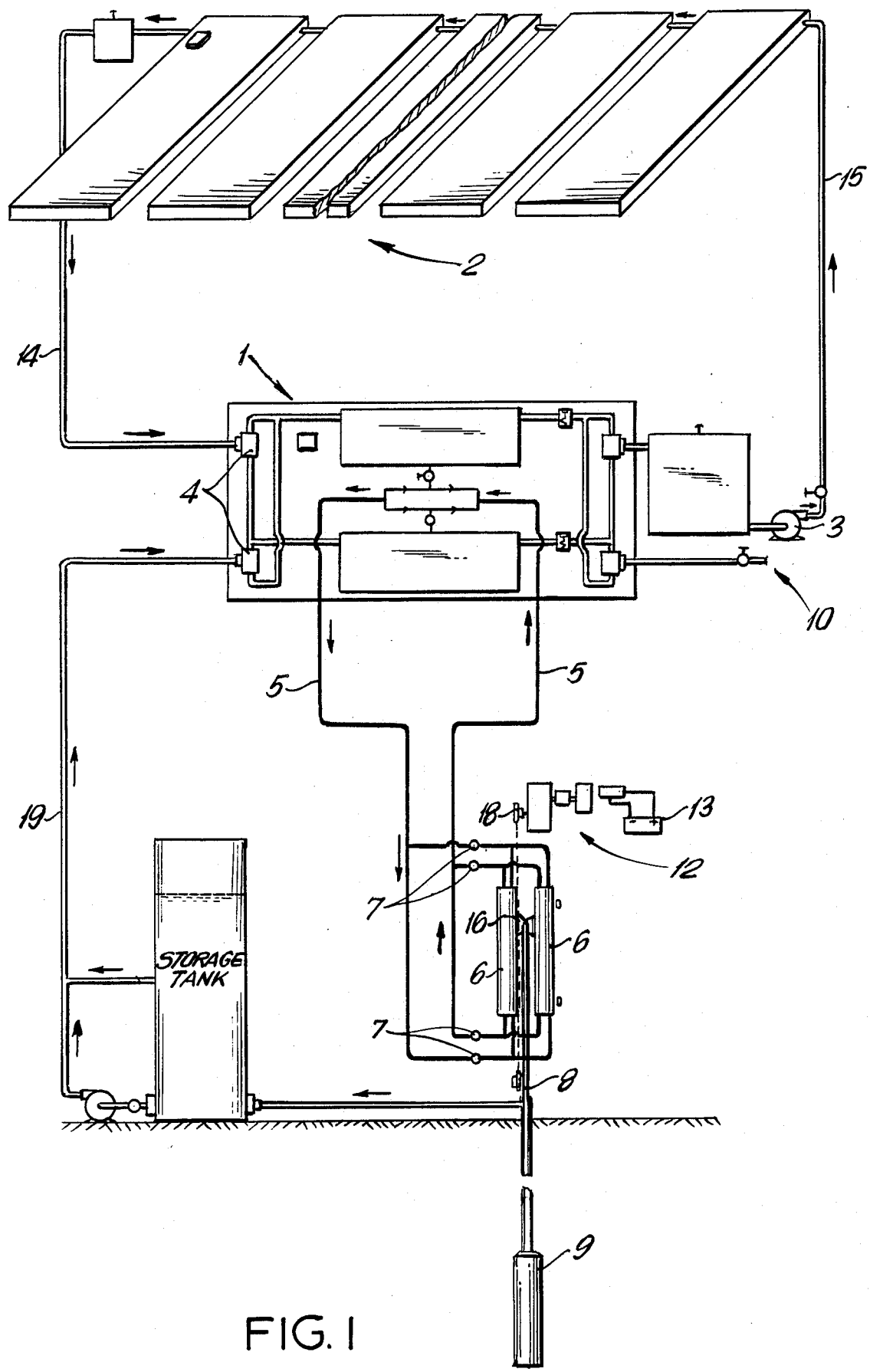
FIG. 1 depicts schematically an operating scheme of Applicant's hydride pump applied to pumping of ground water and shown powered by solar energy.

Principal components of Applicant's solar powered hydride water pump are shown in FIG. 1. Metal hydride compressed gas engine 1 receives heated fluid from solar collector 2 via line 14. The engine 1 operates on metal hydrides (crushed metal powders) which possess an ability to absorb large amounts of hydrogen gas. When this hydrogen is absorbed by the metal hydride, heat is generated. In order to release the hydrogen that is stored in a metal hydride, one applies heat to the hydride. If heat is supplied at a fast rate to the metal hydride, then the hydrogen not only will release its stored hydrogen, but will release it at greatly enhanced pressures. This released hydrogen gas pressure can be many times the pressure of the incoming hydrogen gas pressure that was used to charge (i.e., absorb into) the metal hydride. The higher pressure hydrogen gas that has been generated by the metal hydride can then be used to perform work in much the same way that compressed air is used to perform work in many industrial processes.

A circulating pump 3 moves a heat transfer fluid via line 15 through solar collector 2, then via line 14 to the metal hydride engine 1 to provide heat thereto, as taught in U.S. Pat. No. 4,402,187. Hydrogen gas produced in the engine 1 is conducted to and from a piston cylinder 6 via hydrogen gas transfer lines 5 and solenoid valves 7. Piston cylinder 6 is coupled magnetically to a yoke 16 mounted on piston connecting rod 8 which operates the piston 9 of a reciprocating pump cylinder.

Figure 2:
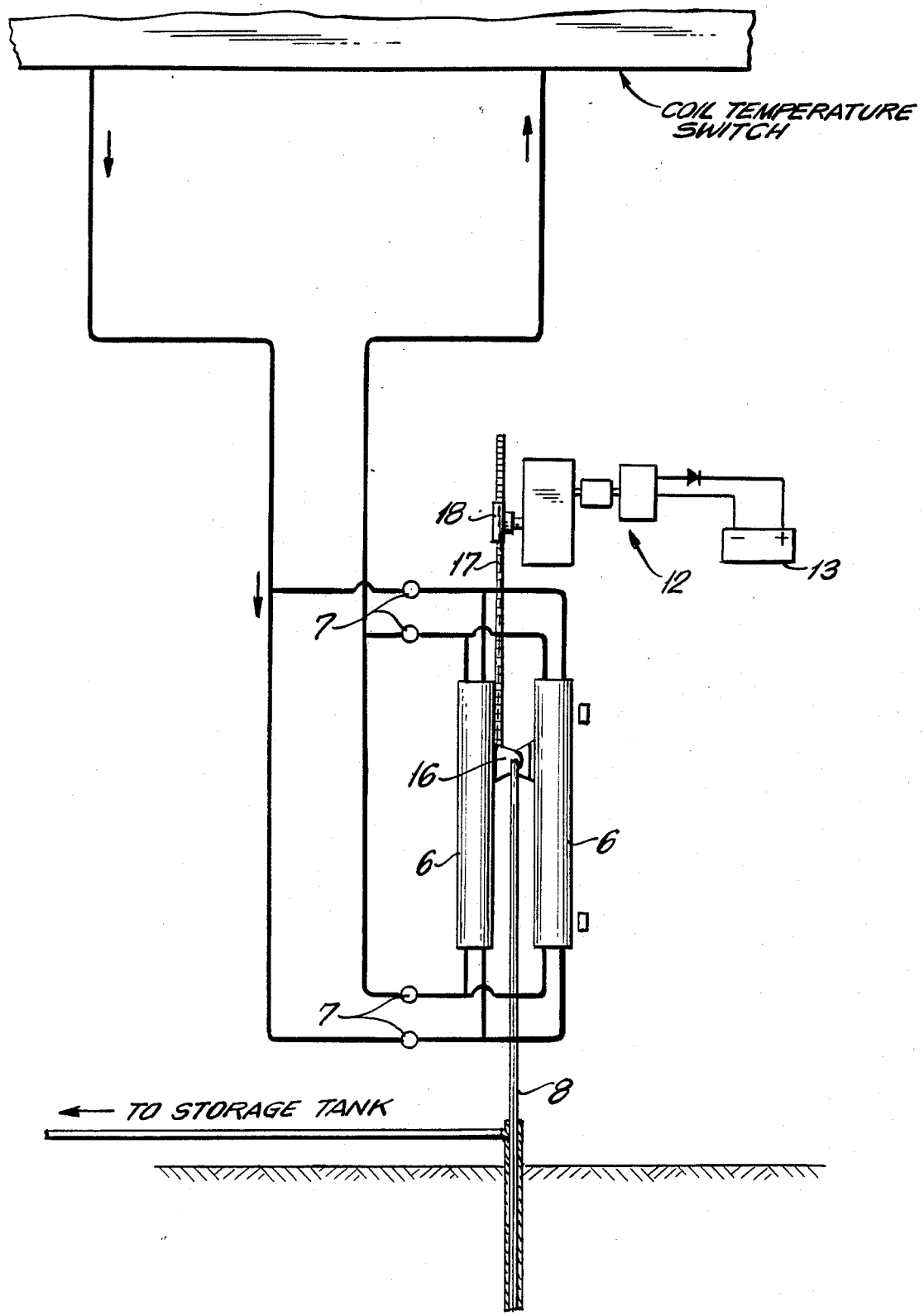
FIG. 2 illustrates schematically the coupling of Applicant's heat engine to a piston of a well pump.
Figure 3:
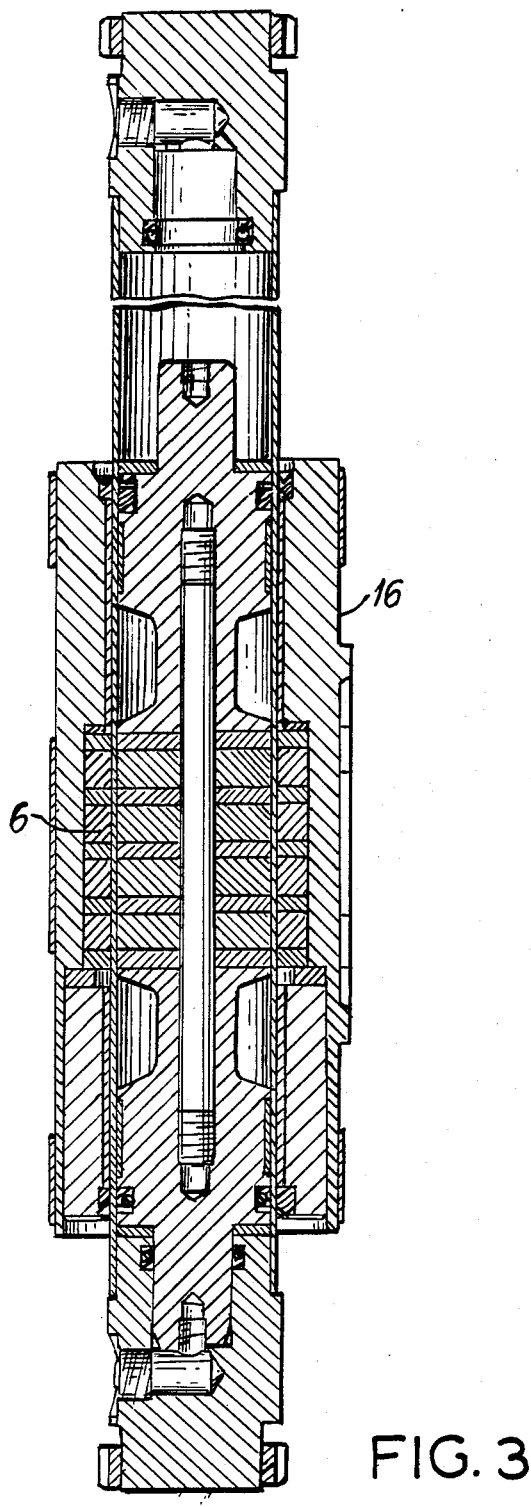
FIG. 3 is a cross sectional view of the magnetic pump piston.
Figure 4:
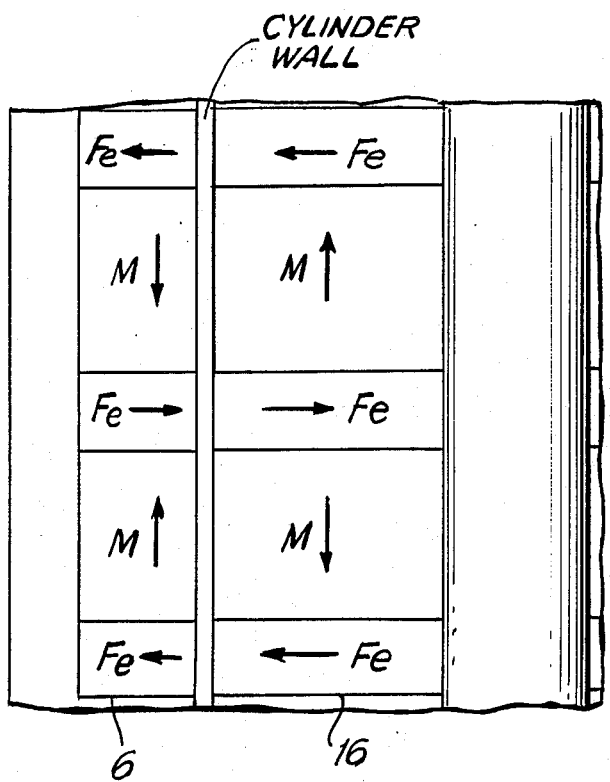
FIG. 4 is a schematic illustration of the magnetic coupling.

As seen in FIG. 2, a rack 17 is mounted on the piston 16 for driving a pinion gear 18 which drives an energy generation system designated generally as 12 to provide electricity to a battery 13 which operates the circulating pump 3 as well as the solenoid valves 4 and 7. Pneumatic valves 4 and 7 can be substituted by adding a small air compressor and storage reservoir.

To cool the engine 1, well water pumped via line 19 is delivered to the engine 1 on its way to being delivered for use at 10.

In a metal hydride device such as a water pump, energy required to heat up the metal hydride powder (and thus pressurize the hydrogen gas) is supplied by hot water via line 14. This hot water typically is supplied at a temperature of about 75° C. (166° F.) but temperatures as low as 50° C.(120° F.) have been used successfully in specially designed metal hydride systems. The temperature of the hot water, therefore, can be at such a low value that it can accommodate economically and efficiently hot water produced by such means as:

1. Flat plate type solar collectors as shown in FIG. 1.
2. Semi-passive and bulk storage solar collectors.
3. Concentrating solar collectors.
4. Catalyzing boiler type devices which generate hot water from such fuels as wood, coal, natural gas, peat and oil shale.
5. Geothermal Sources.

Cooling water also is a prime requirement in a metal hydride water pump, because the very low temperature heat (30° C.) that is generated when the hydrogen is being absorbed by the metal hydride powder must be dissipated. This cooling water requirement for the hydride water pump is satisfied easily by directing cold water that is pumped out of the ground by the water pump piston 9 through line 19 via valves 4 to heat exchangers inside the metal hydride compressor engine 1 before the water is delivered to places of water use designated generally by 10.

Solar collectors 2 convert energy from sunlight into hot water. Flat plate thermal collectors have been found to be one of the most cost efficient ways of utilizing solar energy. These collectors are available at about one-tenth the cost of a comparable size photovoltaic type solar collector.

Hot water circulating pump 3 pumps the hot water produced by the flat plate solar collectors 2 to the hydride compressor engine 1 via line 14 to provide hot water flow necessary to generate hydrogen pressure in the metal hydride. After the hot water has passed through the engine it is cycled back to the flat plate solar collectors via line 15 where it is reheated for reuse. The circulating pump typically would require twelve (12) VDC electricity for operation. Hot water flow rates typically are equal to cold water flow rates.

Heating and cooling water control valves 4 control heating and cooling water in the engine through use of two-way type solenoid water valves. These water valves 4 direct the hot water (from the solar collectors 2) to the metal hydride bed that requires heat in order to release its stored hydrogen. Cold water (that has been pumped out of the ground via line 19) also is controlled by these valves and is sent to the metal hydride bed that requires cooling in order to take away the heat that is generated when hydrogen is being absorbed by the metal hydride. These solenoid control valves typically also require electricity at twelve (12) VDC.

Pressurized hydrogen gas generated by the metal hydride compressor/engine 1 is conducted through tubes 5, which typically are one-fourth inch diameter stainless steel or copper, to the work producing device shown as piston 6. Low pressure hydrogen gas leaves the piston 6 and is conducted back to the engine 1 so that it can be reabsorbed and subsequently repressurized by the hydride compressor. The piston 6 is coupled magnetically to yoke 16 whereby the hydrogen/hydride loop can remain closed. Movement of yoke 16 converts pressurized hydrogen gas generated by the engine 1 into movement and thus work. As seen in FIG. 1, the piston 16 is arranged to move up or down. The magnetically coupled aspect of this cylinder enables the internal piston which contains a permanent magnet ring to be hermetically sealed inside of its stainless steel cylinder. The force of movement of the internal piston is transferred through the wall of the stainless steel cylinder (by the magnetic force field) to a magnetic yoke 16((also made out of magnets) that slides along the inside of the stainless steel piston cylinder. The magnetic coupling eliminates any and all of the dynamic seals which are responsible for hydrogen gas leakage and contamination inherent in conventional pistons.

Hydrogen gas entering and leaving the magnetically coupled piston 6 is controlled by the small two-way solenoid valve 7. This arrangement allows high pressure hydrogen gas to enter on one side of the piston 6, and low pressure hydrogen gas to leave the other side of the piston 6. These control valves 7 require twelve (12) VDC electric current for their operation.

Piston connecting rod 8 is physically connected to the work producing piston 9 in order to reciprocate a water pump and, therefore, efficiently to transfer the work produced by hydrogen piston 6 to water piston 9. The water piston 9 is part of a downhole reciprocating borehole pump. This pump normally is placed down into a well shaft and below the water table and is of conventional construction and operation.

Cold water that has been pumped out of the ground by pump piston 9 is fed into engine 1 via line 19 and thus provides cooling water needed to cool down the metal hydride powder and thus allow it to reabsorb hydrogen gas. After the cold ground water has been passed through the hydride compressor, it is available for use, for irrigation, drinking, etc. at station 10.

Devices such as the hot water circulating pump 3 and the solenoid valves 4 and 7 require a small amount of electric power at twelve (12) VDC to operate. In order to supply this power, a rack and pinion gear mechanism is attached to the magnetic piston 16 (see FIG. 2). In this embodiment, a one-way clutch is built into the pinion spur gear 18. This gear/clutch mechanism is then attached to a gear multiplier transmission. Upon upward movement of the racks, the gear/clutch disengages and freewheeling rotation of the spur gear occurs. However, when the yoke 16 (and therefore rack 17) moves downward, the clutch engages, thus causing the pinion spur gear 18 to rotate. The multiplier transmission is used to increase the rotation of the input shaft such that one revolution of the input shaft of the multiplier results in twenty-four revolutions of the output shaft. The gear/clutch mechanism is attached to the input shaft of the multiplier and the output shaft of the multiplier is attached to a permanent magnet motor. When the permanent magnet motor rotates, an electric current is induced. This electric current is extracted from power leads of the motor and is used to maintain full charge on a twelve-volt battery designated 13. An electrical diode is used to keep the flow of current in one direction only, thus a backflow of current from the battery to the permanent magnet motor does not occur.

A small twelve-volt battery also is included in the preferred embodiment of the invention set forth in FIG. 2 in order to provide temporary power to the hot water circulating pump 3 and the solenoid valves 4, 7 during start-up of the water pump 9 in the morning. This battery is kept fully charged by applying the electricity that is generated by the permanent magnet motor into the battery. A diode placed in this current keeps electricity from backflowing from the battery into the permanent magnet motor. It should be remembered that the solar powered hydride water pump design set forth hereon represents one of many possible hydride water pump designs, and many variations involving different heat sources and work converting devices can be incorporated with the same engine shown here. Stated differently, wide deviations are possible from the shown preferred embodiment without departing from a main theme of invention.

I claim:

1. a pumping apparatus comprising in combination:
   a solar collector,
   a heat exchange circuit including a circulating pump for moving a heat exchange fluid between the solar collector and a compressed gas engine for operation thereof,
   the compressed gas engine provided with a hydriable metal and hydrogen arranged operatively in a sealed loop to drive a master piston,
   a magnetic coupler for coupling the master piston to a slave well pump piston for conjoined motion therewith,
   the well pump piston arranged operatively for pumping a liquid,
   means for passing the liquid in noncontact heat exchange relationship with the hydriable metal for cooling thereof so that it can resorb hydrogen gas,
   a rack connected to the well pump piston and connected to drive a pinion gear which in turn is connected to run a permanent magnet motor to charge a storage battery which in turn is connected to power the circulating pump.

* * * * *